US006554198B1

United States Patent
Hull et al.

(12)
(10) Patent No.: US 6,554,198 B1
(45) Date of Patent: Apr. 29, 2003

(54) SLOPE PREDICTIVE CONTROL AND DIGITAL PID CONTROL

(75) Inventors: Gerry Glancy Hull, Atlanta, GA (US); Steven Treece Tom, Acworth, GA (US); Raynold Lee Saar, Marietta, GA (US)

(73) Assignee: Automated Logic Corporation, Kennesaw, GA (US)

( * ) Notice: Subject to any disclaimer, the term of this patent is extended or adjusted under 35 U.S.C. 154(b) by 60 days.

(21) Appl. No.: 09/850,422

(22) Filed: May 7, 2001

Related U.S. Application Data
(60) Provisional application No. 60/203,229, filed on May 5, 2000.

(51) Int. Cl.[7] .............................. F24F 7/00; G05D 15/00
(52) U.S. Cl. .................... 236/49.3; 236/78 C; 318/610; 700/276
(58) Field of Search .............................. 236/49.3, 78 C, 236/78 D; 165/217; 700/276, 282; 318/610

(56) References Cited

U.S. PATENT DOCUMENTS 4,899,809 A * 2/1990 Takenaka et al. ..... 236/78 C X
5,682,329 A * 10/1997 Seem et al. ................. 62/93 X
6,445,980 B1 * 9/2002 Vyers ..................... 318/610 X

* cited by examiner

Primary Examiner—William Wayner
(74) Attorney, Agent, or Firm—Sutherland Asbill & Brennan LLP

(57) ABSTRACT

The present invention provides an airflow control loop that uses averaged airflow measurements without the problems that are normally encountered with averaging measurements, such as the delay introduced into the airflow control loop. This is accomplished, in the present invention, through a predictive control scheme. The predictive control scheme of the airflow control loop calculates the damper sensitivity, calculates the damper runtime needed to achieve setpoint, and then runs the damper for the determined period of time. In addition to the unique airflow control loop used to maintain the constant airflow into the room, the present invention also implements a digital form of proportional, integral, and derivative (PID) control to maintain the room temperature. The digital form of PID control uses non-linear gains which vary according to how far the measured temperature is from setpoint.

38 Claims, 3 Drawing Sheets

SLOPE PREDICTIVE CONTROL AND DIGITAL PID CONTROL

RELATED APPLICATIONS

The present application claims the benefit of U.S. Provisional Patent Application Ser. No. 60/203,229, filed May 5, 2000.

TECHNICAL FIELD

The present invention relates generally to control systems. More particularly, the present invention relates to Variable Air Volume (VAV) temperature control systems.

BACKGROUND OF THE INVENTION

Variable Air Volume (VAV) temperature control systems control the temperature within a room by modulating the amount of cool (or warm) air that is blown into the room by the heating and air conditioning system. A pressure dependent VAV temperature control system uses a temperature control loop to accomplish a temperature control algorithm. The temperature control loop attempts to maintain a room temperature setpoint by using readings from a room temperature sensor to control a damper in a VAV box. Opening and closing the damper in the VAV box varies the airflow through the VAV box into the room.

One drawback to pressure dependent VAV temperature control systems is that a central Air Handling Unit supplies air to many VAV boxes and when the damper of one VAV box is opened or closed to adjust the temperature in its associated room, the airflow into the other rooms will be affected. This can cause the temperature control loops to "fight" each other, as a temperature change in one room will likely cause a flow change in the other rooms. As a result of the flow changes in the other rooms, the temperatures in those rooms will also change and as the VAV boxes in those rooms react to the temperature changes, they will cause more flow changes and the cycle is repeated. Accordingly, pressure dependent VAV control systems can be inefficient for controlling a heating, ventilation and air conditioning (HVAC) system within a sufficiently large building having multiple rooms.

A pressure independent VAV control system overcomes the problem of temperature control loops "fighting" each other and thus can be more efficient for controlling HVAC system in large buildings. A pressure independent VAV system uses two basic control loops to accomplish the temperature control algorithm. These two basic control loops include a flow control loop for maintaining a specified airflow to the room and a temperature control loop for adjusting the airflow setpoint (specified airflow) of the flow control loop based upon the room temperature. A pressure independent VAV control system thus maintains the specified airflow into the room regardless of pressure changes caused by airflow changes in other rooms.

However, pressure independent VAV control systems also have associated drawbacks. For example, one problem with a typical flow control loop in pressure independent systems is that it is very difficult to provide stable airflow into the room without excessively modulating the damper. The excessive modulation of a damper eventually causes the damper to fail and require replacement. System downtime and maintenance expenses incurred due to failed dampers are common problems in the temperature control industry.

Another drawback associated with a typical flow control loop in a pressure independent VAV control system is the effect of turbulent flow in the air ducts of the system. Electronic sensors can accurately measure instantaneous flow in the air ducts, but the turbulent flow can cause the resulting signals to be very noisy. If the noise in the signals is not filtered in some manner, the flow control loop will react to the peaks and valleys of the signals. As a result, the dampers in the VAV boxes will be continuously adjusted in response to the peaks and valleys in the signals, instead of being adjusted in response to what really affects the room temperature, which is the average airflow into the room over time.

Yet another problem associated with the typical flow control loop of a pressure independent VAV control system results from the inherent non-linear response curve of each damper within each VAV box and from the fact that the electric motors which move these dampers can be damaged by repeated short pulses of current which attempt to move the damper a very short distance. If the pulse is short enough, the motor may not build up enough torque to overcome the static friction needed to move at all. If the damper doesn't move, the flow conditions won't change so the control system will give it another short pulse. If no additional protection is taken, the control system can pulse the motor indefinitely and damage the motor.

To prevent this potential for indefinite pulsing, a minimum run time of, say, one second is typically provided by the motor control circuitry. If the damper controller turns the motor on for even a brief time, the motor control circuit will run the motor for at least one second, ensuring enough torque is developed to actually move the damper. This will, in turn, produce a change in the airflow. If less than a one second movement was needed to bring the flow to setpoint, this one second minimum run time can drive the damper too far and result in a flow reading on the other side of the setpoint. Without additional protection, this would result in the controller giving a short pulse to the damper to move it in the other direction.

The minimum run time would again cause the damper to overshoot the setpoint, and the system could cycle indefinitely, causing excessive wear on the damper and the motor. To prevent this, a deadband is typically set so that the dampers do not move if the measured flow is within a specified tolerance of the setpoint. To prevent cycling, this deadband must be greater than the change in flow caused by a one second damper movement. The "worst case situation," where a little damper movement produces a large change in airflow, typically occurs about mid-range on the damper response curve. In order to avoid cycling in this worst case situation, the flow control loop needs a deadband which is at least as wide as the flow change produced by a one second damper movement at this point.

However, a wide deadband produces inaccurate control at the low and high end of the damper response curve. The low end of the damper response curve is particularly problematic, because of indoor air quality concerns. A temperature control system not only modulates the airflow to keep the temperature in the room at a comfortable level, but also provides the minimum fresh air ventilation for the room. Therefore, a low flow rate and a very wide deadband may cause the airflow control loop to maintain a flow rate that is below the minimum ventilation flow, and cause a problem for indoor air quality.

While the aforementioned problems affect the flow control loop in pressure independent VAV systems, the temperature control loop in such system may also suffer from problems that affect its performance. The temperature control loop typically uses a traditional proportional, integral and derivative (PID) control algorithm to adjust the flow setpoint based upon the temperature in the room. For stable control, low gains are needed for the PID components, but for accurate control high gains are needed. Finding the correct gains is often a difficult process (called "tuning" the control system) and the result is a compromise between stability and accuracy.

Accordingly, there remains a need for an improved pressure independent VAV control system that overcomes some or all of the problems mentioned above.

SUMMARY OF THE INVENTION

The present invention provides an airflow control loop that uses averaged airflow measurements without the problems that are normally encountered with averaging measurements, such as the delay introduced into the airflow control loop. This is accomplished, in the present invention, through the predictive control scheme. The predictive control scheme of the airflow control loop calculates the damper sensitivity, the damper runtime, and then runs the damper for the determined period of time.

If the predicted runtime is less than a predetermined minimum time period, the damper is not moved. Thus the flow control loop uses the predictive control scheme to determine the required deadband around setpoint and does not move the damper unless the actual flow is outside this deadband. Since the predicted runtime is based upon the measured sensitivity of the damper at the current operating conditions, a narrow deadband can be used at low flow rates, where the curve is least sensitive and where indoor air quality concerns are paramount, and a wider deadband can be used at higher flow rates, where the curve is more sensitive.

As a result of using the predictive control scheme, the flow control loop minimizes the movement of the flow control damper and increases the life of the damper operator. When compared to conventional control systems, the predictive control loop decreases the movement of the airflow control damper substantially.

In addition to the unique airflow control loop used to maintain the constant airflow into the room, the present invention also implements a digital form of proportional, integral, and derivative (PID) control to maintain the room temperature. In the present invention, the disadvantages of the traditional PID controls are overcome by dividing the operating range into three distinct regions, and applying a different set of gains to each of the distinct regions. The three different set of gains applied to the three distinct regions are the following: 1) one set of gains is used when the room temperature is far away from setpoint; 2) a second set of gains is used when the room temperature is close to setpoint; and 3) a third set of gains is used in a very narrow band around setpoint, where fine tuning of the digital PID output is required to maintain the room temperature within this deadband. When the room temperature is far away from setpoint the proportional gain is maximized to give "on-off" control for the fastest response, and the integral gain is significantly increased to bring the controller into the correct operating range as quickly as possible. When the temperature is close to setpoint lower gains are used to provide more stable control, and in the narrow band around setpoint a very low set of gains is used to maintain conditions at that point.

DETAILED DESCRIPTION OF EXEMPLARY EMBODIMENTS

In one embodiment, the present invention provides flow and temperature control loops to accomplish a Variable Air Volume (VAV) temperature control algorithm in a manner that addresses the problems encountered in the control of prior art pressure independent VAV control systems.

To address the problem of noisy instantaneous signals representing flow measurements, the present invention averages the instantaneous flow measurements over a period of time. The averaging technique serves to settle and eliminate a significant amount of the noise in the instantaneous flow measurement signals, and provides a better measurement of the average airflow into the room. Normally, when flow measurements are averaged over time, delay is introduced into the control loop. This delay causes the flow controls to overshoot the setpoint because by the time the averaging of the measurements is complete, the airflow control damper has moved past the desired position. The present invention avoids the overshoot problem by using instantaneous flow readings in situations where a fast response is needed, then using average flow readings to get an accurate reading of the flow after the damper is moved and by using a predictive algorithm (rather than feedback control) for the next damper movement.

Figure 1:
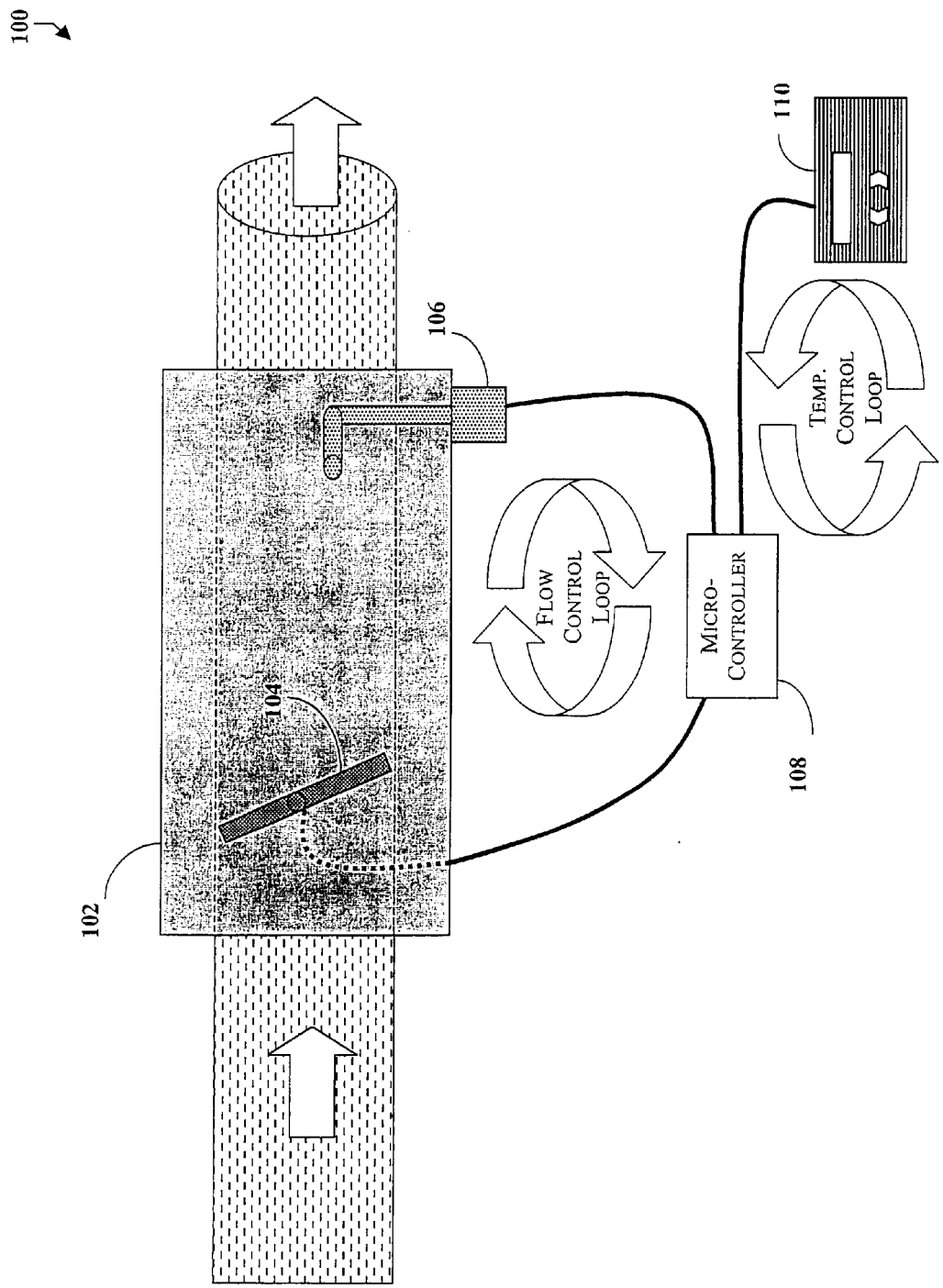
FIG. 1 is a pictorial diagram of the Pressure Independent VAV Control System of the present invention.

The following description will hereinafter refer to the drawings, in which like numerals indicate like elements throughout the several figures. FIG. 1 is a pictorial diagram of an illustrative system 100 for implementing the Variable Air Volume (VAV) temperature control algorithm of an exemplary embodiment of the present invention. The system 100 comprises a VAV box 102, an airflow control damper 104, an airflow sensor 106, a micro-controller 108, and a room temperature sensor 110. The flow control loop measures the airflow into a room, using measurements from the airflow sensor 106. Airflow measurements are used to calculate the slope of the airflow damper response curve (change in flow per unit of time) every time the airflow control damper 104 moves for a measured period of time. For example, the flow control loop may be configured to calculate the change in airflow when the control damper 106 moves for at least one second. A calculated change in airflow can then be used to predict how long the airflow control damper 104 must move in order to deliver the appropriate flow rate needed for maintaining the desired room temperature setpoint.

If the temperature control loop makes a substantial change in the airflow setpoint, the nonlinear characteristic of the damper response curve may cause the predicted damper movement time, which is based upon the slope of the damper response curve at the current operating point, to be incorrect. Thus, in accordance with the present invention, when large setpoint changes occur, an instantaneous reading is used to control the movement of the airflow control damper 104. In this situation, the airflow control damper 104 is moved until another instantaneous airflow is measured that is near or at the new airflow setpoint. Then, the airflow control damper 104 is stopped and an average airflow reading is taken over a particular period of time. At this point, the flow control loop has determined that the actual airflow in the room is near the airflow setpoint, but the flow control loop has not determined the exact damper adjustment that is required to reach the airflow setpoint. The exact duration of the damper movement or adjustment for reaching the desired airflow setpoint is determined using the time duration of the initial damper movement and the average change in airflow during that time duration. From these measurements, the flow control loop determines the sensitivity of the airflow control damper 104 (the slope of the damper response curve). The sensitivity of the airflow control damper 104 is determined in terms of CFM or flow rate per second movement at a particular area on the damper's response curve.

Therefore, once the flow control loop has determined from the instantaneous airflow measurement that the actual airflow in the room is close to the airflow setpoint, the flow control loop calculates the slope of the damper response curve and is able to predict how long the airflow control damper 104 must move to reach the airflow setpoint. This second corrective movement is made based on the damper runtime predicted by the flow control loop. The control loop does not base this second corrective movement on instantaneous airflow measurements, which include a substantial amount of noise. The second corrective movement of the airflow control damper 104 is based upon the sensitivity of the airflow control damper 104 measured in terms of average change in airflow over the initial damper movement time.

Once the airflow control damper 104 completes the predicted movement, the airflow control damper 104 is stopped. Then, the airflow control loop measures the average airflow in the room. The airflow control loop uses the average airflow measurement because an average measurement reduces the noise in the flow measurement and provides an improved measurement of the actual flow into the room. The average airflow is critical in maintaining the room temperature setpoint because the average flow delivered to the room directly affects the room temperature.

In a preferred embodiment of the present invention, the airflow control loop uses the averaged airflow measurements without the problems that are normally encountered with averaging measurements, such as the delay introduced into the airflow control loop. This is accomplished, in the present invention, through the predictive control scheme mentioned above. The predictive control scheme of the airflow control loop calculates the damper sensitivity, the predicted damper runtime, and then moves the damper for the predicted runtime.

As a further enhancement of the present invention, the flow control loop may be configured such that no corrective movement of the airflow control damper 104 will occur if the predicted runtime is less than a predetermined minimum time period. The flow control loop may thus use the predictive control scheme to achieve an airflow that is within a narrow deadband surrounding the airflow setpoint and not move the airflow control damper 104 unless there is a substantial change in the airflow, so that the average airflow deviation from the airflow setpoint requires a damper movement that is more than the predetermined minimum runtime.

As a result of using a minimum runtime, the flow control loop minimizes the movement of the flow control damper 104 and increases the life of the damper operator mechanism (not shown). It has been discovered by the inventors that the predictive flow control loop of the present invention decreases the movement of the air flow control damper 104 by a factor of ten to a factor of one hundred as compared to the damper movements of a conventional control system.

In addition to the unique airflow control loop used to maintain the constant airflow into the room, the present invention also implements a digital form of proportional, integral, and derivative (PID) control to maintain the room temperature. The digital form of PID control has the same general characteristics of traditional PID control, but uses gains which vary according to how far the measured temperature is from setpoint. For example, if the room temperature is far above the temperature setpoint, the temperature control loop calls for full cooling to cool the room quickly and return the room temperature to the room temperature setpoint. The temperature control loop takes this approach to quickly satisfy the room temperature as well as to minimize the damper movement. While in this full cooling mode, a high integral gain is used to quickly adjust the integral portion of the PID algorithm to better suit the current operating conditions. The magnitude of this integral gain depends on how far the integral term was from saturation at the time the controller called for full cooling.

Once the temperature is near setpoint, the temperature control loop uses lower proportional, integral, and derivative gains to fine tune the control and reach setpoint. A variation of traditional PID control is used at this point, the variation being that a fixed integral adjustment is used each time cycle, rather than an adjustment that varies with the error (difference between the measured temperature and the setpoint) and the derivative term acts to counteract the integral term whenever it senses the error is changing in the correct direction, and enables the integral term whenever it senses that the error is unchanging or is changing in the wrong direction. When the temperature is very close to the temperature setpoint, the integral and derivative control terms are disabled and a very low proportional gain is used to maintain these conditions. In other words, the temperature control loop acts as if it were using on/off control at the extremes, it uses a modified PID control when the temperature is within an acceptable range of setpoint, and it uses proportional control when the temperature is within a very narrow "deadband" of the setpoint.

Traditional integral control is proportional to the error, which is defined as the temperature deviation from setpoint. Since the integral action is proportional to the error as the temperature comes close to setpoint the temperature control loop calls for finer control movements. In order to achieve faster response in reaching setpoint and minimize the damper movement, if the temperature is above setpoint, this control scheme adjusts the integral action by some minimal amount every minute regardless of the error. For example, the integral action may be adjusted by 1% for every minute. Furthermore, the temperature control loop does not decrease the adjustment as the temperature comes closer to setpoint.

If the temperature is outside the cooling temperature threshold, the temperature control loop calls for either a 100% or 0% cooling. If the system is also used to provide heating, the control loop similarly calls for 100% or 0% heating when the temperature is outside the heating threshold. In this circumstance, the temperature control loop also starts to accumulate the integral action much faster.

Because of the higher integral gain, when the temperature comes within the temperature threshold, the integral term is much closer to where it should be to obtain the temperature setpoint. The speed with which the integral output is built up depends on the distance that the damper was from its maximum damper position when the temperature control loop initiated the full cooling or heating mode. For example, if the damper is 20% open at the initiation of the full cooling or heating mode, the integral output is accumulated much faster than if the damper was at 80% open. The integral output is non-linear. Once the temperature control loop returns the room temperature to within the threshold, the fine tuning adjustments are used to stay within the temperature threshold.

The present invention also uses the derivative action to act on the integral gain. The temperature control loop uses the derivative action in this manner because in digital systems the temperature control loop can only measure the temperature in one-bit increments. In between the one-bit increments, there is no detected change in temperature, therefore the derivative action will only take effect when the controller registers the one bit change from one measurement to the next. In digital systems, therefore, conventional derivative action becomes discontinuous and the derivative gain may be set so low that it is ineffective or the derivative gain may be set so high that it drives the controller output in the opposite direction.

In the present invention, if the temperature is not changing or if the temperature is moving away from setpoint, the temperature control loop allows the integral gain to act normally. This is the normal mode of operation. When the temperature starts moving toward setpoint, the temperature control loop actually decreases the integral gain to avoid overshooting the temperature setpoint.

From the above description of the present invention, it will be apparent to one of ordinary skill in the art that this invention can be implemented as computer executable instructions that can be executed on any processor-driven system. Having described the system 100 for implementing the slope predictive control and the digital PID control in accordance with an embodiment of the present invention, illustrative methods of carrying out the invention will be described with reference to FIG. 2 and FIG. 3.

Figure 2:
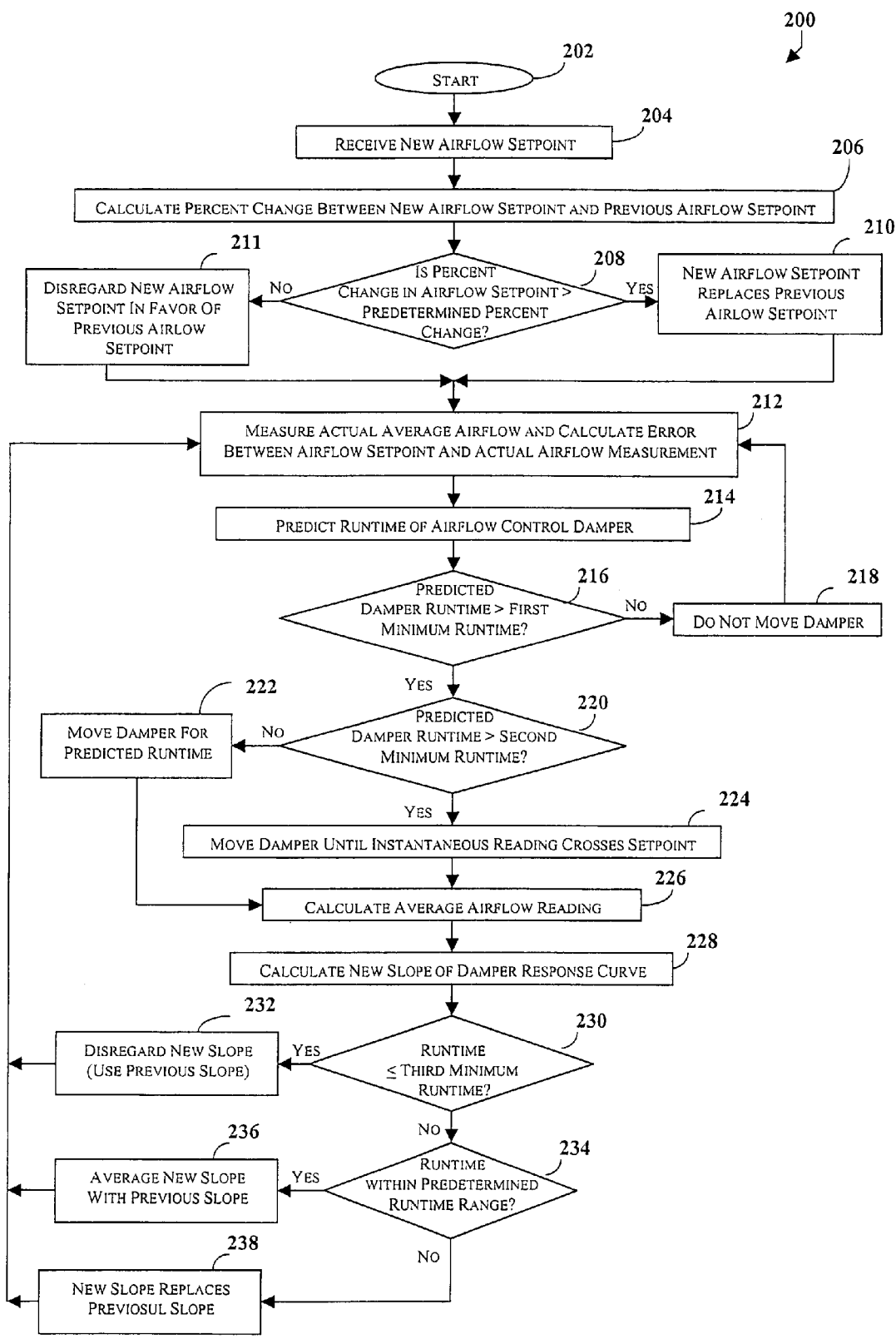
FIG. 2 is a flow diagram illustrating the Slope Predictive Control Method of the present invention.

FIG. 2 is a flow diagram of an illustrative Slope Predictive Control method 200 for controlling airflow control damper movement and maintaining the airflow setpoint into a room. The illustrative method 200 will be described below with reference to the elements of system 100. The Slope Predictive Control method 200 begins at start step 202 and proceeds to step 204 where a new airflow setpoint (NewFlowSp) is received from the temperature control loop. By way of illustrations, the new airflow setpoint may be calculated by the temperature control loop using the following formula:

$$\text{NewFlowSp} = PID_{out} * \text{MaxCFM}$$

where $PID_{out}$ is the PID output of the PID control (see FIG. 3 below) of the present invention and MaxCFM is the maximum CFM for the particular VAV box. Next the method 200 proceeds to step 206.

At step 206, the percent change between the new airflow setpoint and the previous airflow setpoint is calculated. For example, the change in airflow setpoint may be calculated using the following formula:

$$\% \Delta SP = \frac{FlowSp_{new} - FlowSp_{previous}}{MaxCFM}$$

where % ΔSP is the percent change in the airflow setpoint, $FlowSp_{new}$ is the newly calculated airflow setpoint value and $FlowSp_{previous}$ is the last airflow setpoint.

Next the method 200 proceeds to step 208, where a determination is made as to whether the percent change in airflow setpoint is greater than a predetermined percent change in setpoint. For example, the predetermined percent change in setpoint may be set at 5% or some other system operator definable percentage. If at step 208 it is determined that the percent change in setpoint (calculated at step 206) is greater than the predetermined percent change in setpoint, the method 200 proceeds to step 210. At step 210, the new airflow setpoint (calculated at step 204) replaces the previous airflow setpoint. From step 210, the method 200 proceeds to step 212.

However, if it was determined at step 208 that the percentage change in setpoint (calculated at step 206) is less than the predetermined percent change in setpoint, the method 200 proceeds to step 211, where the new setpoint is disregarded in favor of the previous setpoint. From step 211, the method 200 proceeds to step 212.

At step 212, the actual airflow is measured and the error between the airflow setpoint (from step 210 or step 211) and the actual flow measurement is calculated. The actual airflow measurement is preferably measured as an average over a predetermined period of time. Next at step 214, the runtime of the airflow control damper 104 is predicted. In one embodiment of the present invention, the predicted runtime of the airflow control damper 104 is calculated by dividing the error between the airflow setpoint and the actual airflow by the slope of the damper response curve. In the initial pass through the method 200, the slope of the damper response curve is set to a predetermined value or is calculated, for example, by dividing the maximum CFM by the predicted runtime of the airflow control damper 104. For any other iteration through the method 200, the slope is calculated by dividing the measured change in average airflow (see steps 226 & 228 below) by the actual runtime of the airflow control damper 104 from the most recent damper movement.

Once the airflow control damper movement is predicted, the method 200 proceeds to step 216. At step 216, a determination is made as to whether the predicted damper runtime is greater than a first minimum runtime, which is required to protect the damper motor. This minimum runtime may be, for example, 1 second. If at step 216, it is determined that the predicted damper runtime time is less than the first minimum runtime, the method 200 proceeds to step 218 and the airflow control damper 104 is not moved. From step 218, the method 200 returns to step 212 and the process is repeated. However, if it is determined at step 216 that the predicted damper runtime is greater than the first minimum runtime, the method proceeds to step 220, where it is determined whether the predicted damper runtime is greater than a second minimum runtime. The second minimum runtime determines whether the damper movement is short enough that the current slope measurement can accurately be used to predict the required run time. The second minimum runtime may be set at, for example, 11 seconds or any other system operator definable duration. If the predicted movement time is less than the second minimum runtime, then, at step 222, the airflow control damper 104 is run for the predicted damper runtime. However, if at step 220 it is determined that the predicted runtime is greater than the second minimum runtime, the method 200 proceeds to step 224. At step 224, the airflow control damper 104 is run until the airflow sensor 106 supplies an instantaneous reading to the micro-controller 108 indicating that the actual airflow is greater than the airflow setpoint.

After the appropriate movement of the damper at either step 222 or step 224, the method 200 advances to step 226, where the micro-controller 108 calculates a new average airflow reading. Next at step 228, a new slope of the damper response curve is calculated. The slope is calculated by dividing the change in average airflow by either the damper runtime of step 222 or the damper runtime of step 224. The change in average airflow is calculated by taking the absolute value of the difference between the previous average airflow reading (from the previous iteration) and the new average airflow reading calculated at step 226.

After determining the new slope of the damper response curve, method 200 proceeds to step 230, where it is determined whether the predicted damper runtime (calculated at step 214) was less than or equal to a third minimum runtime. This third minimum runtime represents the minimum damper movement needed to get an accurate reading of the slope of the damper response curve, taking into consideration the fact that the real-world damper linkage will have hysteresis and other non-linearities that affect the accuracy of short damper movements. By way of example only, the third minimum runtime may be two seconds or some other system operator definable duration. If the predicted damper runtime is less than or equal to the third minimum runtime, the method 200 proceeds to step 232, where the new slope of the damper response curve (calculated at step 228) is disregarded and the previously calculated slope value is used in the next iteration of the method 200. The new slope calculation is disregarded at step 232 because, for a sufficiently short damper runtime, the build-up in the motor magnetic field, motor friction, and slop in the damper linkage make it difficult to take an accurate measurement of the actual damper runtime and therefore leads to an inaccurate measurement of the slope of the damper response curve.

If at step 230 it was determined that the predicted damper runtime was not less than or equal to the third minimum runtime, the method 200 proceeds to step 234, where it is determined whether the damper runtime (executed at either step 222 or 224) was within a predetermined runtime range. By way of example only, the predetermined runtime range may be from may be from greater than two (2) seconds to less than or equal to four (4) seconds. If at step 234 the damper runtime is determined to be within the predetermined runtime range, the new slope of the damper response curve (calculated at step 228) is averaged with the previous slope of the damper response (i.e., the slope value used in the previous iteration of the method 200) at step 236. The new slope value and the previous slope value are averaged in order to minimize inaccuracies in the slope calculation due to build-up in the motor magnetic field, motor friction, and slop in the damper linkage. Once step 236 is complete, the method 200 returns to step 212 and begins a new iteration.

However, if at step 234 it is determined that the damper runtime (executed at either step 222 or 224) is not within the predetermined runtime range, the method 200 proceeds to step 238, where the new slope of the damper response curve (calculated at step 228) replaces the previous slope value. After step 238 is complete, the method 200 returns to step 212 and begins a new iteration. Those skilled in the art will appreciate that the flow control method 200 may be continuously repeated in order to maintain the airflow in a room for a given airflow setpoint. If at any point during execution of the method 200 a new airflow setpoint is received from the temperature control loop, the method is restarted from step 202.

Figure 3:
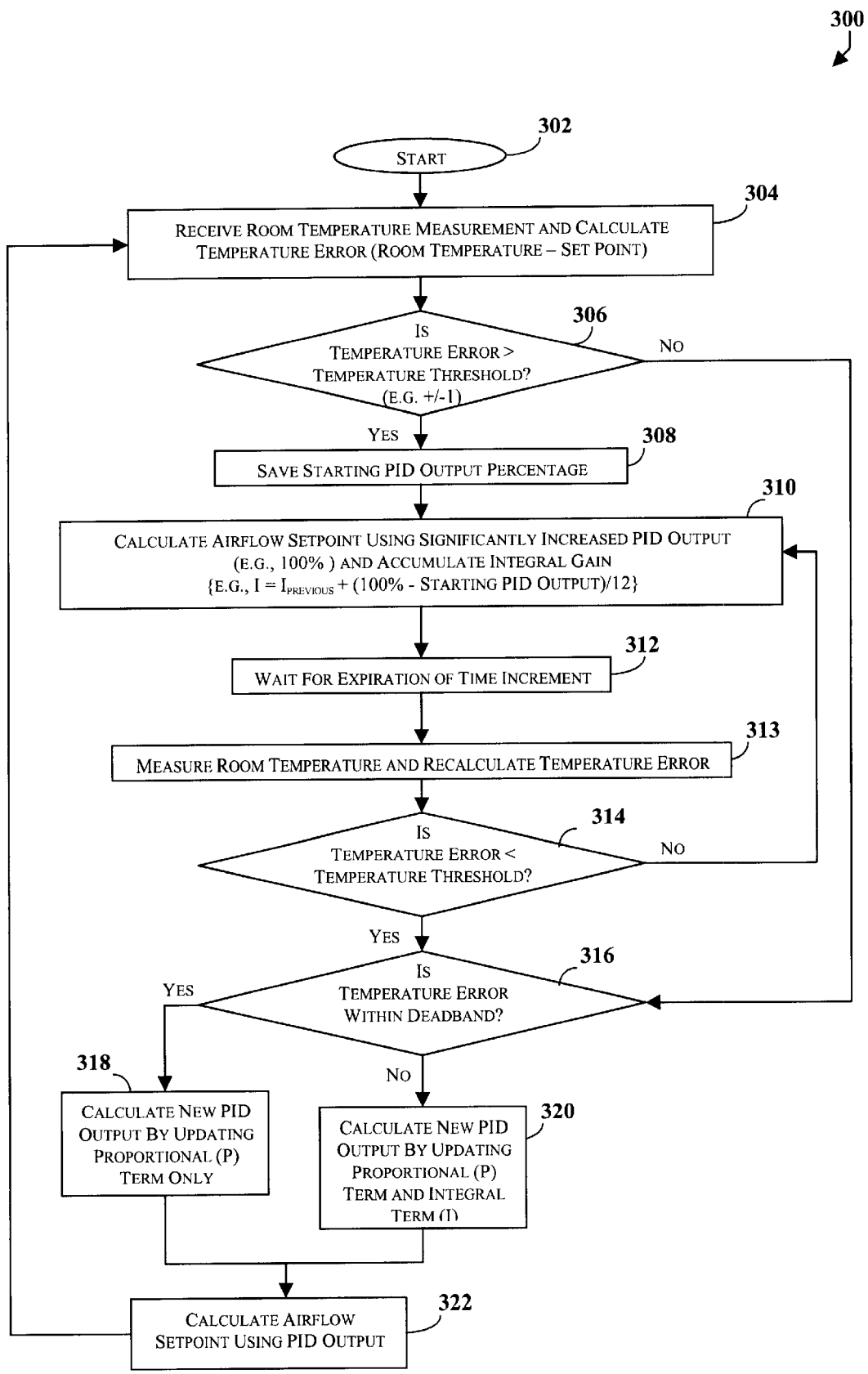
FIG. 3 is a flow diagram illustrating the Digital PID Control Method of the present invention.

FIG. 3 is a flow diagram illustrating an exemplary digital Proportional, Integral and Derivative (PID) control method 300 used for setting an appropriate airflow setpoint to maintain a room temperature. The digital PID control method 300 begins at start step 302 and then proceeds to step 304, where the temperature error is calculated. The temperature error may be calculated by determining the difference between the average room temperature measured over a period of time and the room temperature setpoint. The period of time for measuring the average room temperature may be, for example, 10 seconds.

Next at step 306, a determination is made as to whether the temperature error (calculated at step 304) is greater than a temperature threshold value. The temperature threshold may be defined by the system operator. This threshold determines if the temperature is close enough to setpoint to use the moderate PID gains, or if output needs to jump to 100% or 0% to bring the temperature back into a tolerable range as quickly as possible. This threshold value may be, say +/−1 degree Farenheit. If it is determined at step 306 that the temperature error is not greater than the temperature threshold, the method 300 proceeds to step 316, which is explained below. However, if it is determined at step 306 that the temperature error is greater than the temperature threshold, the method 300 proceeds to step 308, where the starting PID output percentage is saved. Once the starting PID is saved at step 308, the method 300 proceeds to step 310. At step 310, the airflow setpoint is calculated using a significantly increased or decreased PID output percentage (e.g., a PID output percentage of 100% or 0%, depending on whether the room was too hot or too cold.) A setting of 100%, for example, fully opens the airflow control damper 104 to provide full cooling to the room with a minimum number of damper movements. For simplicity of explanation, only the case where the temperature is above setpoint will be described in the following steps. The situation where the temperature is below setpoint is identical, except that the integral term (I) is decreased rather than increased with each step.

Also at step 310, the integral term (I) of the PID control is accumulated. The integral term (I) of the PID control may be accumulated, for example, using the formula that follows:

$$I = I_{previous} + \left( \frac{100\% - Starting\ Output}{12} \right)$$

Those skilled in the art will recognize that the term "12" in the above equation may be replaced by any fixed divisor. From step 310, method 300 proceeds to step 312 to wait for the expiration of an increment of time. After the increment of time expires, the method proceeds to step 313 for a measurement of the room temperature and a new calculation of the temperature error (the difference between the average room temperature measured over a period of time and the room temperature setpoint). Then at step 314 it is determined whether the temperature error is greater than the temperature threshold value. If the temperature error is still greater than the temperature threshold value, the method 300 returns to step 310 and performs the calculations described above.

However, if it is determined at step 314 that the temperature error is not greater that the temperature threshold value, the method 300 proceeds to step 316, where it is determined if the error is within a deadband near the temperature setpoint. If the error is within the deadband, then the method 300 proceeds to step 318 where a new PID output is computed, with only the P term being updated. In this step the integral (I) term is "frozen" at its previous value and only the P term is updated, using the formulae:

$P=20\%*$Temperature Error $PID_{output}=P+I_{previous}$

If it is determined at step 316 that the temperature error is not within the deadband, the method 300 proceeds to step 320 where a new PID output is calculated by updating both the proportional term and the integral term, such as by using the following formulae:

$P=20\%*$Temperature Error If the current error is≧the previous error, $I=I_{previous}+1\%$ If the current error is<the previous error, $I=I_{previous}-1\%$ $PID_{Output}=P+I$ Again, those skilled in the art will recognize that the terms "20%" and "1%" in the above equations may be replaced by other appropriate percentages. The PID output (calculated at either step 318 or 320) may be used at step 322 to calculate a new airflow setpoint, which may be communicated to the flow control loop (e.g., see step 204 of the exemplary Slope Predictive Control method 200 above.) After the new PID output has been calculated at step 322, the method 300 returns to step 304 and repeats the calculations.

Although the present invention has been described above with reference to certain exemplary embodiments of a VAV Control System, many other modifications, features, embodiments and operating environments of the present invention will become evident to those of skill in the art. Thus, various alternative embodiments will become apparent to those skilled in the art and are considered to be within the spirit and scope of the present invention. It should be appreciated that many aspects of the present invention were described above by way of example only and are, therefore, not intended as required or essential elements of the invention. Furthermore, any references herein to predetermined values, minimum values, thresholds and/or specific formulae should be understood as being provided by way of illustration only. Predetermined values, thresholds and formulae may all be defined and re-defined by a system operator in order to better suit the present invention to a particular environment or situation.

Furthermore, from a reading of the foregoing description of certain exemplary embodiments, those skilled in the art will recognize that the slope predictive control and the digital PID control principles of the present invention may have applicability in control system other than VAV temperature control systems. In particular, the control principles of the present invention may be applicable in any non-linear control system, including any control system for controlling a damper, valve, inlet control vein, etc. Accordingly, although the present invention is described herein with reference to VAV temperature control systems, it should be understood that the description is provided by way of example only and not by way of limitation. Accordingly, the scope of the present invention is defined only by the appended claims rather than the by foregoing description of exemplary embodiments.

What is claimed is:

1. A method for controlling a Variable Air Volume (VAV) box in a pressure independent VAV temperature control system comprising:

receiving an indication of an airflow setpoint;

measuring an airflow in the VAV box and calculating an error between the airflow setpoint and the measured airflow; and until a new airflow setpoint indication is received, repeating the steps comprising:

based on the error, predicting a damper runtime to move a damper in the VAV box to achieve the airflow setpoint, if the predicted damper runtime is less than a minimum runtime, not moving the damper and measuring the airflow to calculate an average airflow over a period of time, if the predicted damper runtime is not less than the minimum runtime, measuring the airflow in the VAV box while moving the damper for the predicted damper runtime or until the airflow is measured to have crossed the airflow setpoint, in response to moving the damper, measuring the airflow to calculate the average airflow, and based on the average airflow, recalculating the error.

2. A computer-readable medium having stored thereon computer-executable instructions for performing the method of claim 1.

3. The method of claim 1, wherein the predicted damper runtime is determined by dividing the error by a slope of a damper response curve.

4. The method of claim 3, further comprising:

in response to moving the damper and calculating the average airflow, determining how long the damper was moved and calculating a new slope of the damper response curve;

in response to determining that the damper was moved for less than a second minimum runtime, disregarding the new slope and using the previous slope to recalculate the error;

in response to determining that the damper was moved for a duration within a predetermined runtime range, averaging the new slope with the previous slope and using the averaged slope to recalculate the error; and in response to determining that the damper was moved for longer than the predetermined runtime range, using the new slope to recalculate the error.

5. A computer-readable medium having stored thereon computer-executable instructions for performing the method of claim 4.

6. The method of claim 1, wherein moving the damper for the predicted damper runtime or until the airflow is measured to have crossed the airflow setpoint comprises:

in response to determining that the predicted damper runtime is not greater than a second minimum runtime, moving the damper for the predicted runtime; and in response to determining that the predicted damper runtime is greater than the second minimum runtime, moving the damper until the airflow is measured to have crossed the airflow setpoint.

7. The method of claim 1, further comprising, in response to receiving the airflow setpoint indication, calculating a percent change between the airflow setpoint and a previous airflow setpoint; and in response to determining that the percent change is greater than a predetermined percent change, replacing the previous airflow setpoint with the airflow setpoint.

8. The method of claim 1, wherein the airflow setpoint is calculated using a digital PID control having a proportional term, an integral term and a derivative term, the digital PID control comprising:

receiving a room temperature measurement and calculating a temperature error between the room temperature and a temperature setpoint;

in response to determining that the temperature error is greater than a temperature threshold, calculating the airflow setpoint using a significantly increased or a significantly decreased PID output and accumulating the integral term;

after the expiration of a time increment, re-measuring the room temperature and recalculating the temperature error;

in response to determining that the temperature error is less than the temperature threshold, determining whether the temperature error is within a deadband of the temperature setpoint;

in response to determining that the temperature error is within the deadband of the temperature setpoint, recalculating the PID output by updating the proportional term but not updating the integral term and calculating the airflow setpoint using the recalculated PID output; and in response to determining that the temperature error is not within the deadband of the temperature setpoint, recalculating the PID output by updating the proportional term and the integral term and calculating the airflow setpoint using the recalculated PID output.

9. A computer-readable medium having stored thereon computer-executable instructions for performing the method of claim 8.

10. The method of claim 8, wherein the significantly increased PID output is used in a cooling situation; and
wherein the significantly increased PID output comprises one hundred percent.

11. The method of claim 8, wherein the significantly decreased PID output is used in a heating situation; and
wherein the significantly increased PID output comprises zero percent.

12. A pressure independent Variable Air Volume (VAV) temperature control system comprising:
a VAV box having an airflow control damper for controlling an airflow delivered to a room and an airflow sensor for measuring the airflow;
a temperature sensor within the room for measuring a temperature of the room; and
a micro-controller configured for executing computer-executable instructions for:
receiving a room temperature measurement from the temperature sensor and using the temperature measurement to calculate an airflow setpoint,
receiving an airflow measurement from the airflow sensor and calculating an error between the airflow setpoint and the airflow measurement, and
until a new room temperature measurement is received from the temperature sensor and a new airflow setpoint is calculated, repeating the steps comprising:
based on the error, predicting a damper runtime to move the damper in the VAV box to achieve the airflow setpoint,
if the predicted damper runtime is less than a minimum runtime, not generating a signal for moving the damper and receiving airflow measurements from the airflow sensor to calculate an average airflow over a period of time,
if the predicted damper runtime is not less than the minimum runtime, receiving airflow measurements from the airflow sensor while generating the signal for moving the damper for the predicted damper runtime or until one of the airflow measurements is determined to have crossed the airflow setpoint,
in response to movement of the damper, receiving airflow measurements from the airflow sensor to calculate the average airflow, and
based on the average airflow, recalculating the error.

13. The system of claim 12, wherein the predicted damper runtime is determined by dividing the error by a slope of a damper response curve.

14. The system of claim 13, wherein the micro-controller further executes computer-executable instructions comprising:

in response to movement of the damper and calculation of the average airflow, determining how long the damper was moved and calculating a new slope of the damper response curve;

in response to determining that the damper was moved for less than a second minimum runtime, disregarding the new slope and using the previous slope to recalculate the error;

in response to determining that the damper was moved for a duration within a predetermined runtime range, averaging the new slope with the previous slope and using the averaged slope to recalculate the error; and in response to determining that the damper was moved for longer than the predetermined runtime range, using the new slope to recalculate the error.

15. The system of claim 12, wherein generating the signal for moving the damper for the predicted damper runtime or until the airflow is measured to have crossed the airflow setpoint comprises:

in response to determining that the predicted damper runtime is not greater than a second minimum runtime, generating the signal for moving the damper for the predicted runtime; and in response to determining that the predicted damper runtime is greater than the second minimum runtime, generating the signal for moving the damper until the airflow is measured to have crossed the airflow setpoint.

16. The system of claim 12, wherein the micro-controller further executes computer-executable instructions comprising:

in response to calculating the airflow setpoint, calculating a percent change between the airflow setpoint and a previous airflow setpoint; and in response to determining that the percent change is greater than a predetermined percent change, replacing the previous airflow setpoint with the airflow setpoint.

17. The system of claim 12, wherein the airflow setpoint is calculated using a digital PID control having a proportional term, an integral term and a derivative term, the digital PID control comprising computer-executable instructions for:

in response to receiving the room temperature measurement, calculating a temperature error between the room temperature and a temperature setpoint;

in response to determining that the temperature error is greater than a temperature threshold, calculating the airflow setpoint using a significantly increased PID output and accumulating the integral term;

after the expiration of a time increment, receiving a new room temperature measurement and using the new room temperature measurement to recalculate the temperature error;

in response to determining that the temperature error is less than the temperature threshold, determining whether the temperature error is within a deadband of the temperature setpoint;

in response to determining that the temperature error is within the deadband of the temperature setpoint, recalculating the PID output by updating the proportional term but not updating the integral term and calculating the airflow setpoint using the recalculated PID output; and in response to determining that the temperature error is not within the deadband of the temperature setpoint, recalculating the PID output by updating the proportional term and the integral term and calculating the airflow setpoint using the recalculated PID output.

18. The system of claim 17, wherein the significantly increased PID output is used in a cooling situation; and
wherein the significantly increased PID output comprises one hundred percent.

19. The system of claim 17, wherein the significantly decreased PID output is used in a heating situation; and
wherein the significantly increased PID output comprises zero percent.

20. A method for controlling a Variable Air Volume (VAV) box in a pressure independent VAV temperature control system, the method relying on a PID control having a proportional term, an integral term and a derivative term, the method comprising:
receiving a room temperature measurement and calculating a temperature error between the room temperature and a temperature setpoint;
in response to determining that the temperature error is greater than a temperature threshold, calculating the airflow setpoint using a significantly increased PID output and accumulating the integral term;
after the expiration of a time increment, re-measuring the room temperature and recalculating the temperature error;
in response to determining that the temperature error is less than the temperature threshold, determining whether the temperature error is within a deadband of the temperature setpoint;
in response to determining that the temperature error is within the deadband of the temperature setpoint, recalculating the PID output by updating the proportional term but not updating the integral term and calculating the airflow setpoint using the recalculated PID output; and
in response to determining that the temperature error is not within the deadband of the temperature setpoint, recalculating the PID output by updating the proportional term and the integral term and calculating the airflow setpoint using the recalculated PID output.

21. A computer-readable medium having stored thereon computer-executable instructions for performing the method of claim 20.

22. The method of claim 20, wherein the significantly increased PID output is used in a cooling situation; and
wherein the significantly increased PID output comprises one hundred percent.

23. The method of claim 20, wherein the significantly decreased PID output is used in a heating situation; and
wherein the significantly increased PID output comprises zero percent.

24. The method of claim 20, further comprising:
in response to calculating the airflow setpoint, measuring an airflow in the VAV box and calculating an error between the airflow setpoint and the measured airflow; and
until a new airflow setpoint is cauculated, repeating the steps comprising:
based on the error, predicting a damper runtime to move a damper in the VAV box to achieve the airflow setpoint,
if the predicted damper runtime is less than a minimum runtime, not moving the damper and measuring the airflow to calculate an average airflow over a period of time,
if the predicted damper runtime is not less than the minimum runtime, measuring the airflow in the VAV box while moving the damper for the predicted damper runtime or until the airflow is measured to have crossed the airflow setpoint,
in response to moving the damper, measuring the airflow to calculate the average airflow, and
based on the average airflow, recalculating the error.

25. A computer-readable medium having stored thereon computer-executable instructions for performing the method of claim 24.

26. The method of claim 24, wherein the predicted damper runtime is determined by dividing the error by a slope of a damper response curve.

27. The method of claim 24, further comprising:
in response to moving the damper and calculating the average airflow, determining how long the damper was moved and calculating a new slope of the damper response curve;
in response to determining that the damper was moved for less than a second minimum runtime, disregarding the new slope and using the previous slope to recalculate the error;
in response to determining that the damper was moved for a duration within a predetermined runtime range, averaging the new slope with the previous slope and using the averaged slope to recalculate the error; and
in response to determining that the damper was moved for longer than the predetermined runtime range, using the new slope to recalculate the error.

28. A computer-readable medium having stored thereon computer-executable instructions for performing the method of claim 27.

29. The method of claim 24, wherein moving the damper for the predicted damper runtime or until the airflow is measured to have crossed the airflow setpoint comprises:
in response to determining that the predicted damper runtime is not greater than a second minimum runtime, moving the damper for the predicted runtime; and
in response to determining that the predicted damper runtime is greater than the second minimum runtime, moving the damper until the airflow is measured to have crossed the airflow setpoint.

30. The method of claim 24, further comprising, in response to receiving the airflow setpoint indication, calculating a percent change between the airflow setpoint and a previous airflow setpoint; and
in response to determining that the percent change is greater than a predetermined percent change, replacing the previous airflow setpoint with the airflow setpoint.

31. A pressure independent Variable Air Volume (VAV) temperature control system comprising:
a VAV box having an airflow control damper for controlling an airflow delivered to a room and an airflow sensor for measuring the airflow;
a temperature sensor within the room for measuring a temperature of the room; and
a micro-controller configured for executing computer-executable instructions for performing a PID control having a proportional term, an integral term and a derivative term, the computer-executable instructions comprising:
in response to receiving a room temperature measurement, calculating a temperature error between the room temperature and a temperature setpoint;

in response to determining that the temperature error is greater than a temperature threshold, calculating an airflow setpoint using a significantly increased PID output and accumulating the integral term;

after the expiration of a time increment, receiving a new room temperature measurement and using the new room temperature measurement to recalculate the temperature error;

in response to determining that the temperature error is less than the temperature threshold, determining whether the temperature error is within a deadband of the temperature setpoint;

in response to determining that the temperature error is within the deadband of the temperature setpoint, recalculating the PID output by updating the proportional term but not updating the integral term and calculating the airflow setpoint using the recalculated PID output; and in response to determining that the temperature error is not within the deadband of the temperature setpoint, recalculating the PID output by updating the proportional term and the integral term and calculating the airflow setpoint using the recalculated PID output.

32. The system of claim 31, wherein the significantly increased PID output is used in a cooling situation; and
wherein the significantly increased PID output comprises one hundred percent.

33. The system of claim 31, wherein the significantly decreased PID output is used in a heating situation; and
wherein the significantly increased PID output comprises zero percent.

34. The system of claim 31, wherein the micro-controller further executes computer-executable instructions comprising:

in response to receiving the airflow setpoint, receiving an airflow measurement from the airflow sensor and calculating an error between the airflow setpoint and the airflow measurement; and until a new room temperature measurement is received from the temperature sensor and a new airflow setpoint is calculated, repeating the steps comprising:

based on the error, predicting a damper runtime to move the damper in the VAV box to achieve the airflow setpoint, if the predicted damper runtime is less than a minimum runtime, not generating a signal for moving the damper and receiving airflow measurements from the airflow sensor to calculate an average airflow over a period of time, if the predicted damper runtime is not less than the minimum runtime, receiving airflow measurements from the airflow sensor while generating the signal for moving the damper for the predicted damper runtime or until one of the airflow measurements is determined to have crossed the airflow setpoint, in response to movement of the damper, receiving airflow measurements from the airflow sensor to calculate the average airflow, and based on the average airflow, recalculating the error.

35. The system of claim 34, wherein the predicted damper runtime is determined by dividing the error by a slope of a damper response curve.

36. The system of claim 35, wherein the micro-controller further executes computer-executable instructions comprising:

in response to movement of the damper and calculation of the average airflow, determining how long the damper was moved and calculating a new slope of the damper response curve;

in response to determining that the damper was moved for less than a second minimum runtime, disregarding the new slope and using the previous slope to recalculate the error;

in response to determining that the damper was moved for a duration within a predetermined runtime range, averaging the new slope with the previous slope and using the averaged slope to recalculate the error; and in response to determining that the damper was moved for longer than the predetermined runtime range, using the new slope to recalculate the error.

37. The system of claim 34, wherein generating the signal for moving the damper for the predicted damper runtime or until the airflow is measured to have crossed the airflow setpoint comprises:

in response to determining that the predicted damper runtime is not greater than a second minimum runtime, generating the signal for moving the damper for the predicted runtime; and in response to determining that the predicted damper runtime is greater than the second minimum runtime, generating the signal for moving the damper until the airflow is measured to have crossed the airflow setpoint.

38. The system of claim 34, wherein the micro-controller further executes computer-executable instructions comprising:

in response to calculating the airflow setpoint, calculating a percent change between the airflow setpoint and a previous airflow setpoint; and in response to determining that the percent change is greater than a predetermined percent change, replacing the previous airflow setpoint with the airflow setpoint.

* * * * *